(12) United States Patent
Tsujinaka

(10) Patent No.: US 12,261,982 B2
(45) Date of Patent: Mar. 25, 2025

(54) IMAGE PROCESSING SYSTEM AND NON-TRANSITORY COMPUTER READABLE MEDIUM STORING PROGRAM FOR DISTRIBUTING AND RECORDING LOGS OF IMAGE PROCESSING

(71) Applicant: FUJIFILM Business Innovation Corp., Tokyo (JP)

(72) Inventor: Hiroki Tsujinaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 428 days.

(21) Appl. No.: 17/378,759

(22) Filed: Jul. 18, 2021

(65) Prior Publication Data
US 2022/0239786 A1    Jul. 28, 2022

(30) Foreign Application Priority Data
Jan. 27, 2021   (JP) .................................. 2021-010899

(51) Int. Cl.
*H04N 1/00* (2006.01)
(52) U.S. Cl.
CPC ....... *H04N 1/0009* (2013.01); *H04N 1/00244* (2013.01)
(58) Field of Classification Search
None
See application file for complete search history.

(56) References Cited

U.S. PATENT DOCUMENTS

| 7,523,499 B2 * | 4/2009 | Wilkins | H04L 63/083 726/23 |
| 7,568,220 B2 * | 7/2009 | Burshan | H04L 63/0272 726/4 |

(Continued)

FOREIGN PATENT DOCUMENTS

| JP | 2007299284 | 11/2007 |
| JP | 2011003090 | 1/2011 |

(Continued)

OTHER PUBLICATIONS

"Notice of Reasons for Refusal of Japan Counterpart Application", issued on Sep. 3, 2024, with English translation thereof, pp. 1-5.

(Continued)

*Primary Examiner* — Akwasi M Sarpong
*Assistant Examiner* — Pawan Dhingra
(74) *Attorney, Agent, or Firm* — JCIPRNET

(57) ABSTRACT

An image processing system includes: a first processor that is mounted on an image processing apparatus including at least one of an image forming unit that performs processing of forming an image on a medium or an image scanning unit that performs processing of scanning an image on a medium; and a second processor that is mounted on a control apparatus that is connected to the image processing apparatus via a virtual leased line, and controls a part of at least one of the processing of forming an image on a medium or the processing of scanning an image on a medium performed by the image processing apparatus, in which the first processor is configured to: in a case where an event to be recorded in a log occurs in the image processing apparatus, transmit log information regarding the event to the control apparatus via the virtual leased line being connected or after connecting the virtual leased line in a case where the virtual leased line is not connected; and the second processor is configured to: in a case where the event occurs in the control apparatus, (Continued)

store log information regarding the event in a storage unit of the control apparatus; and store log information transmitted from the image processing apparatus via the virtual leased line in the storage unit of the control apparatus.

6 Claims, 7 Drawing Sheets

(56) References Cited

U.S. PATENT DOCUMENTS

| | | | |
|---|---|---|---|
| 9,531,893 B2 | 12/2016 | Ishino et al. | |
| 10,001,954 B2 | 6/2018 | Minagawa | |
| 2003/0055990 A1* | 3/2003 | Cheline | H04L 63/0272 709/229 |
| 2008/0239350 A1* | 10/2008 | Ohira | H04N 1/40 358/1.9 |
| 2009/0089592 A1* | 4/2009 | Kudo | H04L 9/3297 713/193 |
| 2012/0113977 A1* | 5/2012 | Shimoosawa | H04L 61/2575 370/352 |
| 2013/0003103 A1* | 1/2013 | Barber | G06F 3/1288 358/1.14 |
| 2013/0014100 A1* | 1/2013 | Akiyama | G06F 11/3612 717/176 |
| 2015/0163377 A1* | 6/2015 | Ge | H04N 1/4426 358/1.14 |
| 2015/0215314 A1* | 7/2015 | Pisharody | G06F 21/32 726/7 |
| 2015/0222604 A1* | 8/2015 | Ylonen | H04L 9/3263 713/171 |
| 2015/0324152 A1* | 11/2015 | Ding | G06F 3/126 358/1.15 |
| 2016/0227072 A1* | 8/2016 | Yoshikawa | H04N 1/00347 |
| 2017/0052587 A1* | 2/2017 | Eun | G06F 1/3246 |
| 2017/0214712 A1* | 7/2017 | Maxwell | H04L 63/1441 |
| 2019/0005531 A1* | 1/2019 | Hatakeyama | G06Q 30/0226 |
| 2019/0158501 A1* | 5/2019 | Peppe | H04L 63/107 |
| 2020/0201959 A1* | 6/2020 | Takemori | G06F 21/31 |
| 2020/0267178 A1* | 8/2020 | Maor | H04L 63/1425 |
| 2020/0412619 A1* | 12/2020 | Nakamura | H04L 45/42 |
| 2021/0326432 A1* | 10/2021 | Kaidi | H04L 9/3226 |
| 2022/0201146 A1* | 6/2022 | Ito | G06V 30/19067 |
| 2022/0232376 A1* | 7/2022 | Dauneria | H04L 63/0861 |
| 2022/0300225 A1* | 9/2022 | Oshima | G06F 3/1286 |

FOREIGN PATENT DOCUMENTS

| | | |
|---|---|---|
| JP | 2011040900 | 2/2011 |
| JP | 2012174174 | 9/2012 |
| JP | 2013020354 | 1/2013 |
| JP | 2015099552 | 5/2015 |
| JP | 2016144152 | 8/2016 |
| JP | 2019012448 | 1/2019 |
| JP | 2020048092 | 3/2020 |

OTHER PUBLICATIONS

"Office Action of Japan Counterpart Application", issued on Jan. 21, 2025, with English translation thereof, pp. 1-7.

* cited by examiner

FIG. 2

USER MANAGEMENT INFORMATION

| ORGANIZATION ID | AUTHENTICATION INFORMATION | | CONNECTION INFORMATION | | CONTROL APPARATUS ADDRESS | CONTRACT INFORMATION | AUDITOR ID |
|---|---|---|---|---|---|---|---|
| | USER ID | PASSWORD | VPN ROUTER ADDRESS | AUTHENTICATION DATA | | | |
| K001 | U00101 | pwd01 | 123.456.789.012 | | 123.456.789.001 | ONLY MONOCHROME PRINTING | M001 |
| | U00102 | pwd02 | | | | | |
| K002 | U00201 | pwd03 | 123.456.789.123 | | 123.456.789.100 | | |
| ... | | | | | | | |

FIG.7

LOG INFORMATION

| LOG IDENTIFIER | DATE AND TIME OF OCCURRENCE | MONITORING EVENT IDENTIFIER | MONITORING EVENT | MONITORING EVENT DETAILS | USER ID | RESULT |
|---|---|---|---|---|---|---|
| 0001 | m1/d1/yyy1 h1: m1: s1 | 1001 | Login | Login | User 01 | Success |
| 0002 | m1/d1/yyy1 h1: m2: s2 | 1002 | Logout | Logout | User 01 | Success |
| 0003 | m1/d1/yyy1 h3: m3: s3 | 1001 | Login | Login | User 02 | Failed (Invalid password) |
| 0004 | m1/d1/yyy1 h4: m4: s4 | 1001 | Login | Login | User 03 | Success |

71 72 73 74

IMAGE PROCESSING SYSTEM AND NON-TRANSITORY COMPUTER READABLE MEDIUM STORING PROGRAM FOR DISTRIBUTING AND RECORDING LOGS OF IMAGE PROCESSING

CROSS-REFERENCE TO RELATED APPLICATIONS

This application is based on and claims priority under 35 USC 119 from Japanese Patent Application No. 2021-010899 filed Jan. 27, 2021.

BACKGROUND

(i) Technical Field

The present invention relates to an image processing system and a non-transitory computer readable medium storing a program.

(ii) Related Art

JP2020-048092A proposes a technology for separating an image processing apparatus in a local network and a control apparatus outside the local network and performing image processing performed by the image processing apparatus on the side of the control apparatus according to hardware specifications of the image processing apparatus and contract services. In a case where a control apparatus of a certain organization controls a plurality of image processing apparatuses to perform similar image processing by using this technology, a user belonging to the organization can use the image processing apparatuses with identical usability even in any of local networks in which the image processing apparatuses are installed.

In this case, from the viewpoint of security, for example, it is preferable to establish a virtual leased line, a so-called virtual private network (VPN) between the image processing apparatus and the control apparatus, and then exchange information between the image processing apparatus and the control apparatus.

SUMMARY

In a case where a virtual leased line is established between the control apparatus and the image processing apparatus and the control apparatus controls the execution of image processing performed in the image processing apparatus via the virtual leased line, at the time of performing image processing, logs related to events that occurred on the side of the control apparatus are recorded on the side of the control apparatus, and logs related to events that occurred on the side of the image processing apparatus are recorded on the side of the image processing apparatus. That is, the logs related to one image processing are distributed and recorded.

Other examples of related art include JP2011-040900A, JP2015-099552A, and JP2016-144152A.

Aspects of non-limiting embodiments of the present disclosure relate to an image processing system and a non-transitory computer readable medium storing a program that collect log information recorded by an image processing apparatus and a control apparatus that controls image processing in the image processing apparatus via a virtual leased line on the side of the control apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing system including: a first processor that is mounted on an image processing apparatus including at least one of an image forming unit that performs processing of forming an image on a medium or an image scanning unit that performs processing of scanning an image on a medium; and a second processor that is mounted on a control apparatus that is connected to the image processing apparatus via a virtual leased line, and controls a part of at least one of the processing of forming an image on a medium or the processing of scanning an image on a medium performed by the image processing apparatus, in which the first processor is configured to: in a case where an event to be recorded in a log occurs in the image processing apparatus, transmit log information regarding the event to the control apparatus via the virtual leased line being connected or after connecting the virtual leased line in a case where the virtual leased line is not connected; and the second processor is configured to: in a case where the event occurs in the control apparatus, store log information regarding the event in a storage unit of the control apparatus; and store log information transmitted from the image processing apparatus via the virtual leased line in the storage unit of the control apparatus.

BRIEF DESCRIPTION OF THE DRAWINGS

Exemplary embodiment(s) of the present invention will be described in detail based on the following figures, wherein:

FIG. 2 is a diagram showing an example of a data configuration of user management information stored in a user management information storage unit in the present exemplary embodiment;

FIG. 7 is a diagram showing a data configuration example of log information generated by an image processing apparatus in the present exemplary embodiment.

DETAILED DESCRIPTION

Hereinafter, exemplary embodiments of the present invention will be described with reference to the drawings.

Figure 1:
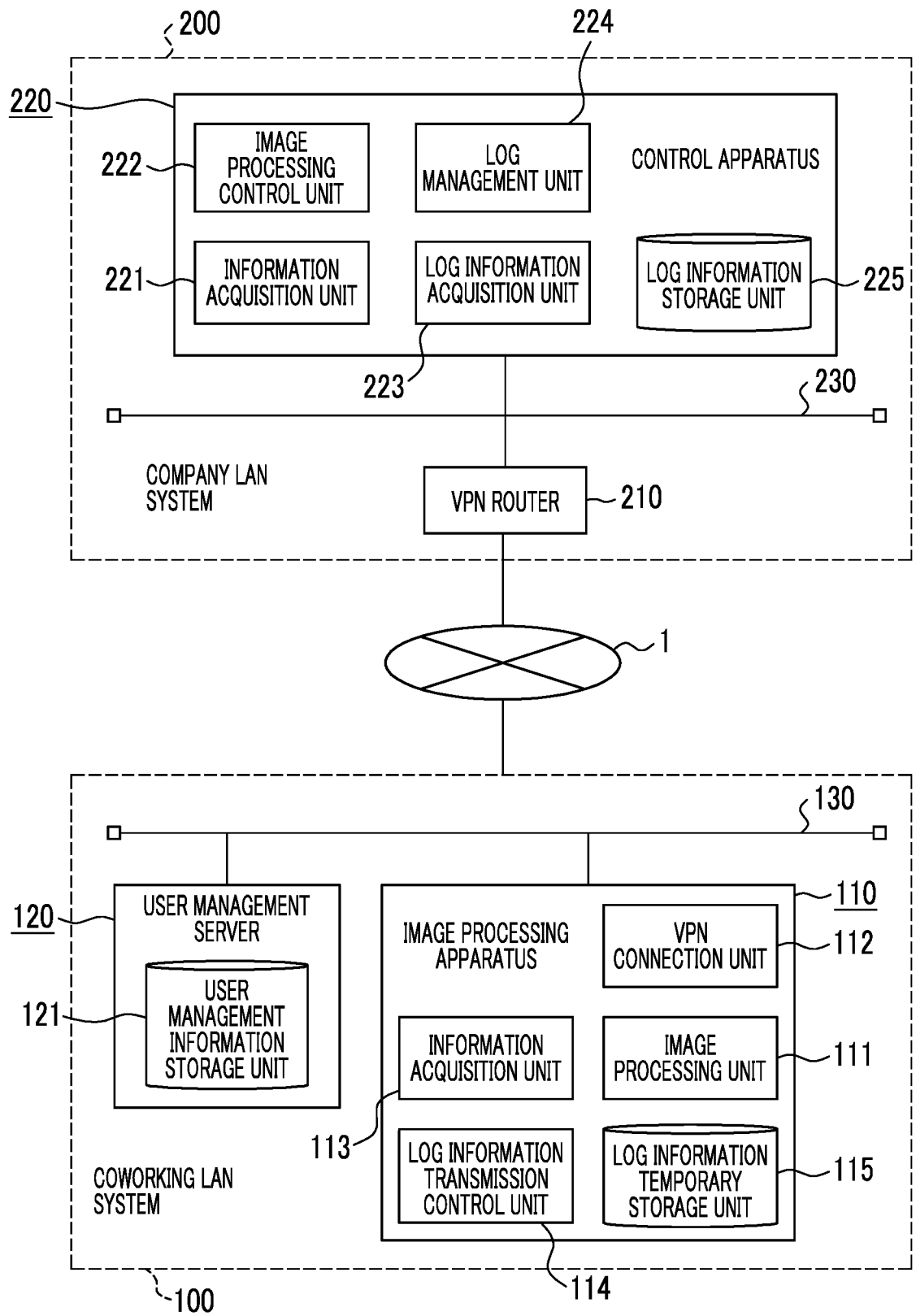
FIG. 1 is a block configuration diagram showing an image processing system according to an exemplary embodiment.

FIG. 1 is a block configuration diagram showing an image processing system according to an exemplary embodiment of the present invention. FIG. 1 shows a configuration in which a coworking local area network (LAN) system 100 and a company LAN system 200 are connected via a network 1 configured as the Internet or the like. The image processing system according to the present exemplary embodiment can be achieved by combining, as hardware, traditional computers and the like, and characteristic image processing in the present exemplary embodiment is controlled by software operating on each computer as will be described later.

The coworking LAN system 100 is a LAN system installed in a coworking space. In the present exemplary embodiment, a coworking space will be described as an example of a shared space in which a plurality of users who do not belong to the identical organization coexist. Other shared spaces include shared offices. The "organization" refers to a group configured to achieve a particular purpose. In the present exemplary embodiment, a company will be described as an example of the organization. Accordingly, in the following description, the "organization" and the "company" are used synonymously.

The company LAN system 200 is a LAN system installed in the company. As described above, the "company" is an example of an organization to which a user who uses the coworking space belongs.

Since the coworking LAN system 100 may be used by users belonging to different companies, the company LAN system 200 is constructed for each company to which each user belongs. On the other hand, since a user belonging to an organization may use a plurality of coworking spaces, a plurality of coworking LAN systems 100 may be provided. However, since the company LAN system 200 of each company has the configuration shown in FIG. 1, and the coworking LAN system 100 installed in the coworking space has the configuration shown in FIG. 1, only one system is shown for each. The coworking LAN system 100 and the company LAN system 200 are each connected to the network 1 such as the Internet.

The coworking LAN system 100 in the present exemplary embodiment is configured such that an image processing apparatus 110 and a user management server 120 are connected to each other via a LAN 130.

The image processing apparatus 110 is installed in the coworking space and is used only by the users of the coworking space. More specifically, the image processing apparatus 110 is available to users belonging to organizations that sign a contract with a manager of the coworking space.

The image processing apparatus 110 in the present exemplary embodiment is achieved by an image forming apparatus such as a multifunction device having various image processing functions such as a printing function, a copying function, and a scanner function, and is a device having a built-in computer. The image processing apparatus 110 includes a CPU as a first processor, a ROM, a RAM, an HDD, a scanner as an image scanning device that scans an image on a medium such as a sheet, a print engine as an image forming device that forms an image on a medium, an operation panel that receives instructions from users and displays information, and a network interface that connects communication lines such as the network 1 and the LAN 130 to each other. Further, the image processing apparatus 110 may include an external medium interface for connection with an external memory device such as a USB memory or a flash memory, and a wireless communication unit that performs short-range wireless communication with a mobile terminal.

In the present exemplary embodiment, the "image processing" includes not only processing such as forming and scanning directly performed on an image, but also pre-processing of performing image processing such as forming and reading of an image in a broader sense (for example, processing of acquiring an image and the like) and post-processing (for example, image storage processing or the like).

The image processing apparatus 110 includes an image forming unit that performs processing of forming an image on a medium and an image scanning unit that performs processing of scanning an image on a medium. However, the image processing apparatus may be configured to include at least one of an image forming unit or an image scanning unit. The image processing apparatus 110 includes an image processing unit 111, a VPN connection unit 112, an information acquisition unit 113, a log information transmission control unit 114, and a log information temporary storage unit 115. The components not used in the description of the present exemplary embodiment are omitted from the drawings.

The image processing unit 111 executes image processing under control by a control apparatus 220 based on apparatus information and contract information in response to a request from the user. The image processing unit 111 in the present exemplary embodiment corresponds to the image forming unit and the image scanning unit described above, and provides various image processing functions according to the hardware and software included in the image processing apparatus 110. However, each user who is permitted to use the coworking space may not be able to use all the functions provided by the image processing apparatus 110, and can use the functions within a range specified in the contract information regarding the use of the coworking space.

The VPN connection unit 112 acquires address information (for example, IP address) of a VPN router 210 installed in the company LAN system 200 of the company to which the user belongs in response to a request from the user, and performs VPN connection, which is a virtual leased line, with the company LAN system 200 to which the user belongs. In the present exemplary embodiment, connection between two parties, that is, between the coworking LAN system 100 and the company LAN system 200 so as to be communicable by VPN in the case of the present exemplary embodiment is referred to as "VPN connection". The VPN connection unit 112 disconnects the VPN connected in response to a disconnection request. The information acquisition unit 113 acquires information necessary for controlling the VPN connection and the image processing as will be described in detail later.

In a case where an event to be recorded in a log occurs in the image processing apparatus 110, the log information transmission control unit 114 controls transmission of log information regarding the event to the control apparatus 220 via VPN. Specifically, when the VPN is connected, the log information transmission control unit 114 transmits the log information via the connected VPN. In a case where the VPN is not connected, the log information transmission control unit 114 temporarily stores log information regarding the event in the log information temporary storage unit 115, and then transmits the log information when the VPN is connected.

In a case where the log information cannot be transmitted to the control apparatus 220 as described above, the log information temporary storage unit 115 stores the log information.

Each of the components 111 to 114 in the image processing apparatus 110 is achieved by a cooperative operation of a computer mounted on the image processing apparatus 110 and a program operating on a CPU mounted on the computer. The log information temporary storage unit 115 is achieved by the HDD mounted on the image processing apparatus 110. Alternatively, a storage unit in the RAM or the coworking LAN system 100 may be used via the LAN 130.

The user management server 120 is a server used for managing users who are permitted to use the coworking space by contract. The user management server 120 has a user management information storage unit 121. The user management information storage unit 121 may be achieved by the HDD mounted on the image processing apparatus 110.

FIG. 2 is a diagram showing an example of a data configuration of user management information stored in the user management information storage unit 121 in the present exemplary embodiment. The user management information in the present exemplary embodiment includes an organization ID, authentication information, connection information, control apparatus address, contract information, and an auditor ID. The organization ID is identification information of the organization that signs a contract with the manager of the coworking space. The authentication information is information necessary, when the image processing apparatus 110 is used in the organization, that is, information necessary, when the user logs in to the image processing apparatus 110, and is set for each individual who uses the image processing apparatus 110. As the authentication information, a set of a user ID and a password, which is information for identifying the user, is set. The user management server 120 in the present exemplary embodiment has a function of an authentication server by retaining and managing the authentication information. The connection information includes information necessary for connection with the company LAN system 200. As a VPN router address included in the connection information, the IP address of the VPN router installed in the company LAN system 200 of the organization is set as the address information.

Authentication data necessary for establishing connection with the VPN router is set as authentication data. The authentication data is defined by a policy of the VPN router, such as a user certificate and a passcode. At least the address information of the VPN router may be included in the connection information. The IP address of the control apparatus 220 is set as the control apparatus address. The contract information is information regarding the contract signed between the manager of the coworking space and the company. The contract information includes service information indicating contents of services available to the users of the organization. For example, even though the image processing apparatus 110 has functions of color printing and monochrome printing as a color mode, a user belonging to a company permitted to use only the monochrome printing by contract is permitted to use only the monochrome printing. In the auditor ID, the user ID of the observer is set as information for identifying an auditor who audits the log information in the organization.

The company LAN system 200 is configured such that the VPN router 210 and the control apparatus 220 are connected to each other via the LAN 230.

The VPN router 210 performs the VPN connection with an external network system, that is, the coworking LAN system. 100 in the case of the present exemplary embodiment. The VPN router 210 in the present exemplary embodiment relays data exchanged between the image processing apparatus 110 included in the coworking LAN system 100 connected via the VPN and the control apparatus 220.

The control apparatus 220 controls a part of processing of forming an image on the medium and processing of scanning the image on the medium executed by the image processing apparatus 110. However, the control apparatus may be configured to control a part of at least one of the processing of forming an image or the processing of scanning an image according to the image processing function of the image processing apparatus 110. The control apparatus 220 can be achieved by a general-purpose hardware configuration such as a traditional personal computer (PC). That is, the image processing apparatus 110 includes a CPU as a second processor, a ROM, a RAM, an HDD, a user interface such as an operation panel that receives instructions from users and displays information, and a network interface that connects communication lines such as the network 1 and the LAN 230 to each other.

The control apparatus 220 includes an information acquisition unit 221, an image processing control unit 222, a log information acquisition unit 223, a log management unit 224, and a log information storage unit 225. The components not used in the description of the present exemplary embodiment are omitted from the drawings.

The information acquisition unit 221 acquires information necessary for controlling the execution of image processing in the image processing apparatus 110. Specifically, apparatus information indicating the apparatus configuration of the image processing apparatus 110 and contract information regarding the use of the image processing apparatus 110 of the organization ("company" in the present exemplary embodiment) are acquired from the image processing apparatus 110 via the VPN router 210. The apparatus information may include, for example, specification information indicating a hardware configuration or a software configuration included in the image processing apparatus 110, or the apparatus information may include ability information indicating ability of a service or a function achieved by the hardware configuration or the software configuration included in the image processing apparatus 110. The image processing control unit 222 controls the execution of the image processing in the image processing apparatus 110 according to the apparatus information and the contract information.

The log information acquisition unit 223 acquires the log information transmitted from the image processing apparatus 110. The log management unit 224 stores the log information acquired by the log information acquisition unit 223 in the log information storage unit 225. Further, when the image processing control unit 222 controls the execution of image processing in the image processing apparatus 110, log information may be generated due to the occurrence of an event to be recorded in the log, but the log management unit 224 also stores log information generated in the control apparatus 220 in the log information storage unit 225.

Each of the components 221 to 224 in the control apparatus 220 is achieved by a cooperative operation of a computer forming the control apparatus 220 and a program operated by a CPU mounted on the computer. The log information storage unit 225 is achieved by the HDD or RAM mounted on the control apparatus 220. Since the log information storage unit 225 may be required to be located on the side of the control apparatus 220, a storage unit located in the company LAN system 200, which is a storage unit provided in a place other than the control apparatus 220, may be used via the LAN 230.

The programs used in the present exemplary embodiment can be provided not only by a communication unit but also while being stored in a computer-readable recording medium such as a CD-ROM or a USB memory. The programs provided by the communication unit and the recording medium are installed on the computer, and various types of processing are achieved by sequentially executing the programs by the CPU of the computer.

Next, an operation in the present exemplary embodiment will be described. First, in the present exemplary embodiment, schematic processing of controlling the image processing in the image processing apparatus 110 by the control apparatus 220 will be described with reference to the flowchart shown in FIG. 3. The details of the processing will be described later.

In a case where the user in the coworking space wants to start using the image processing apparatus 110, the user inputs the authentication information to the image processing apparatus 110. The image processing apparatus 110 performs user authentication based on the input authentication information while referring to the user management information (step S110). The user authentication performed herein is positioning as authentication for specifying the VPN router 210 as a VPN connection destination rather than user authentication for using the image processing apparatus 110. However, in the present exemplary embodiment, these pieces of authentication will not be separated. That is, the user attempts to log in by inputting the authentication information. Here, the description will be continued on the assumption that the authentication has succeeded, that is, the login has succeeded.

Subsequently, the information acquisition unit 113 in the image processing apparatus 110 acquires the connection information corresponding to the organization to which the user who has succeeded in the authentication belongs while referring to the user management information (step S120). More specifically, the IP address of the VPN router 210 installed in the company LAN system 200 of the company to which the user who logs in to the image processing apparatus 110 and starts using the image processing apparatus belongs is acquired.

Subsequently, the VPN connection unit 112 establishes the VPN connection between the image processing apparatus 110 and the VPN router 210 by using the acquired connection information (step S130). A procedure of the VPN connection may be identical to the traditional connection procedure.

By the above processing (steps S110 to S130), the image processing apparatus 110 installed in the coworking space and the control apparatus 220 that controls the image processing in the image processing apparatus 110 from the outside can securely perform data communication via the VPN.

Subsequently, the control apparatus 220 controls the image processing in the image processing apparatus 110 as follows.

First, in the control apparatus 220, the information acquisition unit 221 acquires apparatus information and contract information from the image processing apparatus 110 (step S140). The details of the processing related to the acquisition of apparatus information and contract information will be described later.

The image processing control unit 222 activates the image processing function in the image processing apparatus 110 according to the acquired apparatus information and contract information (step S150). Subsequently, the image processing control unit 222 controls the image processing apparatus 110 to perform the image processing within a range of the activated function. In other words, the image processing unit 111 in the image processing apparatus 110 executes the image processing in response to an instruction from the user (step S160), but the execution of the image processing is executed under the control of the image processing control unit 222. The image processing is continued until the end of the image processing is instructed from the user (N in step S170), and the processing is ended in a case where the end of the image processing is instructed from the user (Y in step S170).

Hereinafter, the details of the processing (steps S140 to S170) executed after the VPN connection will be described.

Although not shown in FIG. 1, a program management server is provided on the cloud. The program management server manages a plurality of image processing programs. Each image processing program is associated with identification information (for example, a user ID) of a user who can use the program.

In a case where the authentication information is acquired from the image processing apparatus 110, the program management server replies an access path (for example, a URL, an IP address, a port number, or the like) to the image processing program corresponding to the user ID included in the authentication information to the image processing apparatus 110.

The authentication information used herein is authentication information for logging in to and using the image processing apparatus 110. The authentication information used in step S110 is authentication information used for selecting a correct VPN connection destination. In the present exemplary embodiment, the authentication information managed by the user management server 120 is used in common for the sake of convenience, but it is not necessary to use the identical authentication information for performing the VPN connection and logging in to the image processing apparatus 110.

The image processing apparatus 110 transmits, to the control apparatus 220, a connection request with the image processing program by using the user ID and the access path acquired from the program management server. For example, Hypertext Transfer Protocol Security (HTTPS) may be used for the connection request from the image processing apparatus 110 to the control apparatus 220.

In a case where the connection request with the image processing program is received from the image processing apparatus 110, the control apparatus 220 performs the user authentication, and in a case where the authentication has succeeded, the control apparatus replies, from the control apparatus 220 to the image processing apparatus 110, information indicating the connection success as a response to the connection request. More specifically, in a case where an access key acquired as a usage reservation from the program management server by using the acquired access path and an access key included in the connection request received from the image processing apparatus 110 match, the control apparatus 220 replies the information indicating the connection success to the image processing apparatus 110.

In a case where the information on the connection success is replied, the image processing apparatus 110 transmits, to the control apparatus 220 that executes the image processing program, the apparatus information indicating the apparatus configuration of the image processing apparatus 110, which is executed in step S140.

The image processing control unit 222 in the control apparatus 220 controls the execution of the image processing in the image processing apparatus 110 by controlling a device such as a print engine or a scanner included in the image processing apparatus 110 according to the image processing program managed by the program management server as described above.

That is, the image processing control unit 222 in the control apparatus 220 determines a function or a service to be provided to the image processing apparatus 110 based on the apparatus information and the contract information and provides image data of a user interface image corresponding to the function or the service to be provided to the image processing apparatus 110 by executing the connected image processing program. Further, the image processing control unit 222 limits the operation by the image processing apparatus 110 according to the function or the service to be provided.

For example, in a case where it is found that the image processing apparatus 110 has both a monochrome printing function and a color printing function by referring to the apparatus information, the image processing control unit 222 controls the execution of the monochrome printing or the color printing in response to a user operation by providing a user interface image including an operation button of the monochrome printing and an operation button of the color printing to the image processing apparatus 110.

For example, even though the image processing apparatus 110 has both the monochrome printing function and the color printing function, in a case where it is found that the user contracts only a monochrome printing service and does not contract a color printing service by referring to the contract information, the control may be performed such that the execution of the color printing is limited (prohibited) by providing, to the image processing apparatus 110, a user interface image for activating the operation button of the monochrome printing and deactivating the operation button of the color printing. In order to deactivate the operation button of the color printing, for example, a method for hiding the operation buttons or dimming a display color to indicate non-selectable may be used.

In a case where the user interface image is provided, the image processing unit 111 in the image processing apparatus 110 displays the user interface image on a display device such as a touch panel. For example, processing corresponding to the operation from the user obtained via the user interface image is executed.

In a case where there is the user operation, the image processing unit 111 transmits operation information on the user operation to the control apparatus 220. Examples of the operation information include touch information indicating a type of an operation on the touch panel (for example, touch operation or release operation) and coordinate information indicating a position on the touch panel on which the operation corresponding to the touch information is performed. For example, the image processing unit 111 transmits, as an HTTP request, the operation information to the control apparatus 220.

In a case where the operation information is received, the image processing control unit 222 in the control apparatus 220 controls the image processing in the image processing apparatus 110 by executing the processing corresponding to the operation information. For example, the image processing control unit 222 updates the user interface image as necessary according to the operation information obtained from the image processing apparatus 110, and provides the updated user interface image to the image processing apparatus 110. For example, in a case where a plurality of pieces of operation information are continuously obtained, the image processing control unit 222 may omit a part of the update related to the user interface image and reduce a load of drawing processing.

Figure 3:
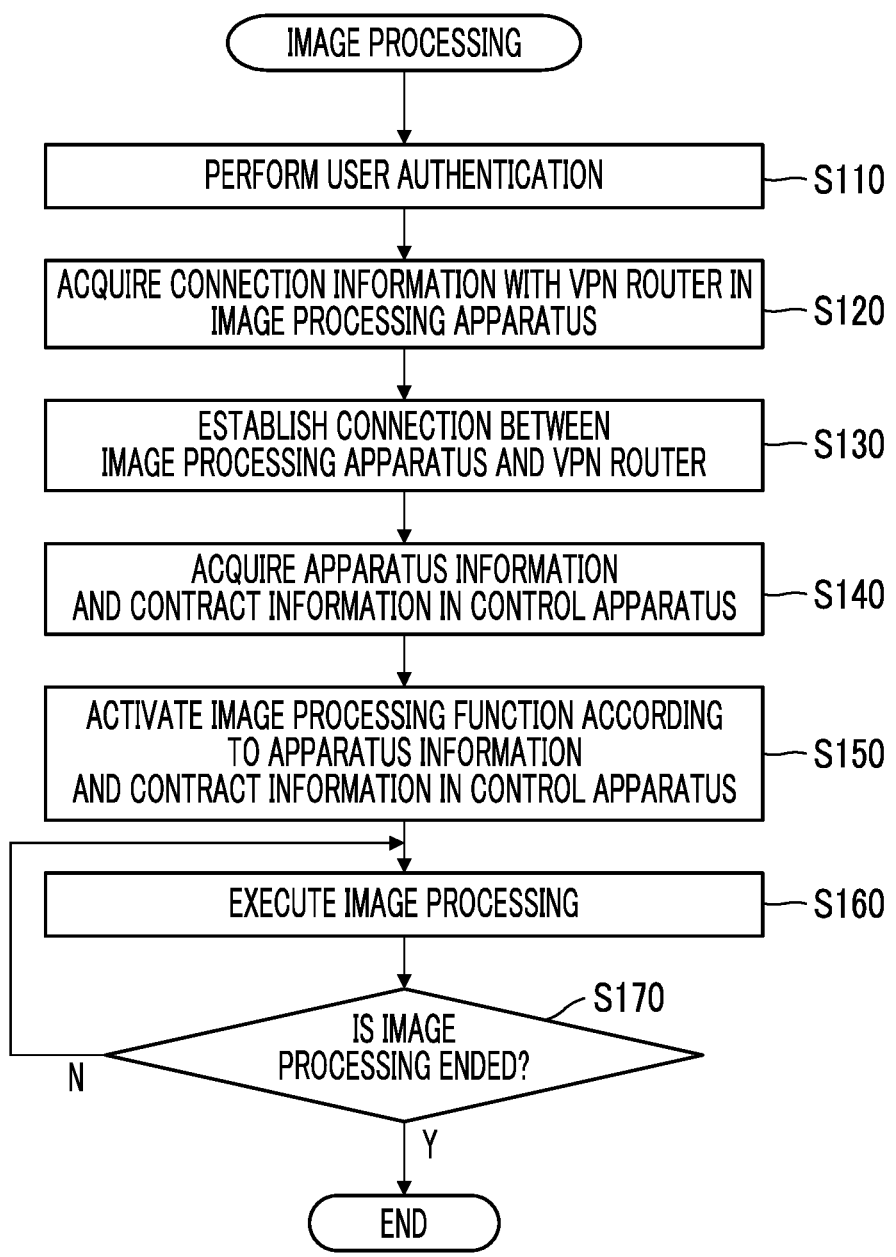
FIG. 3 is a flowchart showing schematic processing of image processing control in the present exemplary embodiment.

In a case where the user performs an operation of disconnecting the image processing program after ending intended image processing, the image processing apparatus 110 disconnects the connected image processing program. Accordingly, the image processing shown in FIG. 3 is ended.

An outline of processing of controlling the execution of the image processing by connecting the image processing apparatus 110 and the control apparatus 220 via the VPN has been described above. Subsequently, the details of the processing performed at the time of the VPN connection in the present exemplary embodiment will be described with reference to a sequence diagram shown in FIG. 4. The processing shown in FIG. 4 corresponds to the details of the processing of steps S110 to S130 of the flowchart shown in FIG. 3. As will be clear from the description of the exemplary embodiments, the detailed order of the processing shown in the sequence diagram may not match a schematic order of the processing shown in steps S110 to S130 in some exemplary embodiments.

In a case where the user in the coworking space wants to start using the image processing apparatus 110, the user inputs, as the authentication information, a user ID and a password from a predetermined screen displayed by operating the operation panel of the image processing apparatus 110. The image processing apparatus 110 performs the user authentication by collating a set of the input user ID and password with the authentication information registered in the user management information (step S111). Here, the description will be continued on the assumption that the authentication has succeeded, that is, the user has logged in to the image processing apparatus 110.

Subsequently, the information acquisition unit 113 transmits, to the user management server 120, an address acquisition request including the user ID that has succeeded in the authentication (step S121). The user management server 120 reads out and replies the connection information corresponding to the user ID included in the address acquisition request from the user management information in response to the transmitted address acquisition request (step S122).

In a case where the information acquisition unit 113 acquires the connection information as described above, the VPN connection unit 112 transmits a VPN connection request including the authentication data included in the connection information to the VPN router 210 specified by the IP address included in the acquired connection information (step S131).

In a case where the VPN connection request is transmitted from the image processing apparatus 110, the VPN router 210 performs authentication for performing the VPN connection based on the authentication data (step S132). In a case where the authentication has succeeded, the VPN router 210 replies the authentication success. Accordingly, the image processing apparatus 110 establishes the VPN connection with the VPN router 210 (step S133).

Subsequently, the processing performed at the time of the image processing control after the VPN connection will be described with reference to a sequence diagram shown in FIG. 5. The processing shown in FIG. 5 correspond to the details of the processing of steps S140 to S170 of the flowchart shown in FIG. 3.

In the image processing apparatus 110, the information acquisition unit 113 transmits, to the user management server 120, an organization information acquisition request including the user ID that has succeeded in the authentication (step S141). The user management server 120 reads out and replies the control apparatus address and the contract information corresponding to the user ID included in the organization information acquisition request from the user management information in response to the transmitted organization information acquisition request (step S142).

Subsequently, the image processing apparatus 110 transmits, to the control apparatus 220, the connection request with the image processing program including the user ID as described above in order to perform the connection with the image processing program which is executed to receive the image processing control by the control apparatus 220 (step S143). The control apparatus 220 as a transmission destination can be specified by the control apparatus address acquired in step S142. Since the processing related to the connection with the image processing program have already been described above, the description herein will be omitted.

In a case where the user authentication has succeeded and the connection with the image processing program has succeeded, the image processing apparatus 110 transmits, to the control apparatus 220, the apparatus information of the image processing apparatus retained therein and the contract information acquired in step S142 (step S144).

In the control apparatus 220, in a case where the information acquisition unit 221 acquires the apparatus information and the contract information transmitted from the image processing apparatus 110 via the VPN router 210, the image processing control unit 222 activates the image processing function specialized for the user who has logged in to the image processing apparatus 110 according to the apparatus information and the contract information (step S151). Thereafter, the image processing unit 111 performs the image processing in response to the user operation (step S161), and the image processing control unit 222 controls the image processing performed by the image processing unit 111 in response to the user operation according to the apparatus information and the contract information (step S162). Since the content of the image processing control has already been described above, the description herein will be omitted. In a case where the image processing is ended, the image processing apparatus 110 disconnects the connected image processing program (step S163).

According to the present exemplary embodiment, secure communication may be ensured by performing the VPN connection with the company LAN system 200 of the company to which the user who logs in and uses the image processing apparatus 110 belongs as described above.

Incidentally, the disconnection of the VPN not mentioned in the above description will be described herein. The VPN may be disconnected at any of the timings described below.

For example, the VPN is disconnected and information regarding the VPN connection is deleted from the image processing apparatus 110 at a timing at which the user logs out from the image processing apparatus 110. In this case, since the VPN is disconnected and the information regarding the VPN connection is discarded at a timing at which it is not necessary to access the control apparatus 220 of the company LAN system 200, safety is ensured in terms of security.

The information regarding the VPN connection may be retained for a specified fixed time. The information regarding the so-called VPN connection is cached. That is, the image processing apparatus 110 temporarily retains the information regarding the VPN connection for a period in which a certain time has not elapsed after logging out. In a case where the logged-out user logs in again before a certain time has elapsed, the VPN connection is performed by utilizing the temporarily retained information. Accordingly, processing such as acquiring the address of the VPN router 210 can be omitted.

Alternatively, in the case of the coworking space that manages times at which each user enters and leaves, the information regarding the VPN connection may be discarded from the image processing apparatus 110 at a timing at which the user who uses the image processing apparatus 110 leaves the coworking space. Accordingly, the processing such as acquiring the address of the VPN router 210 can be omitted whenever the image processing apparatus 110 is used until the user leaves.

It is assumed that a start point in time of the certain time is a point in time at which the user logs out, but the present invention is not limited thereto, and may be, for example, a point in time at which the user logs in immediately before or a point in time at which the image processing is ended.

Incidentally, in a case where the image processing apparatus 110 performs image processing under the control of the control apparatus 220, the log is recorded in a case where an event to be recorded in the log occurs. In this case, a log regarding an event that occurred in the image processing apparatus 110 is recorded in the image processing apparatus 110. Further, a log regarding an event that occurred in the control apparatus 220 when the control apparatus 220 controls execution of image processing in the image processing apparatus 110 is recorded in the control apparatus 220. That is, since the logs regarding image processing are recorded in a distributed manner, it is not preferable in terms of log management, for example. Therefore, in the present exemplary embodiment, log information can be collectively managed by collecting the log information in the control apparatus 220.

All logs may be collectively managed by the control apparatus 220, but only audit logs related to audits may be subject to collective management. An audit log is a log regarding a crucial event in terms of security. Examples of the audit log include user login and logout, system parameter setting change, system startup and shutdown, and the like.

Figure 6:
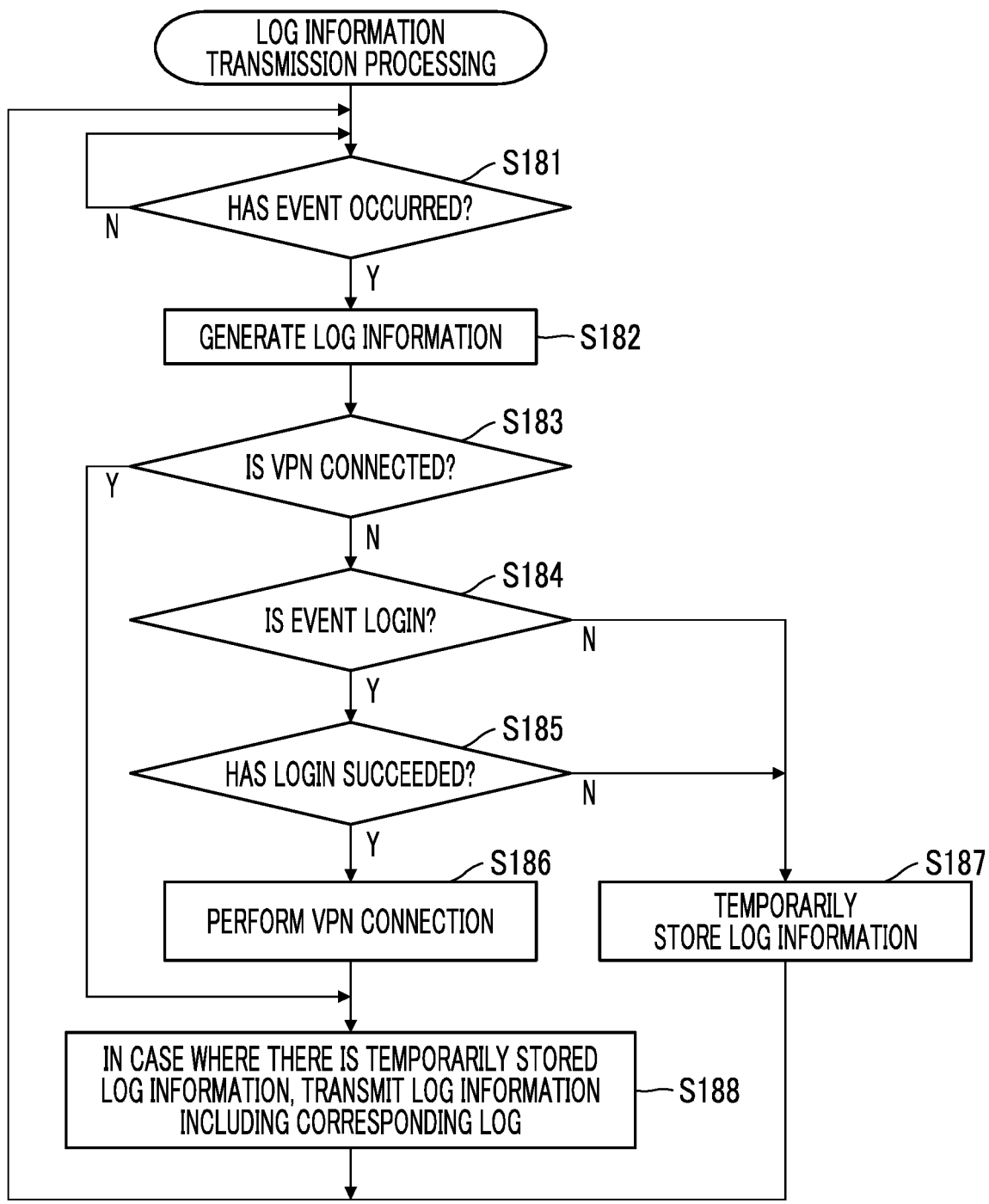
FIG. 6 is a flowchart showing log information transmission processing in the present exemplary embodiment.

In order to collect and manage the log information in the control apparatus 220, the image processing apparatus 110 needs to transmit the log information to the control apparatus 220 at a predetermined timing. Hereinafter, log information transmission processing performed by the image processing apparatus 110 in the present exemplary embodiment will be described with reference to the flowchart shown in FIG. 6.

The log information transmission control unit 114 constantly monitors whether or not an event to be recorded in the log has occurred in the image processing apparatus 110 (N in step S181). Then, in a case where the corresponding event has occurred (Y in step S181), log information is generated by a log information generation unit (not shown) (step S182). Here, the data configuration of the log information generated by the image processing apparatus 110 will be described.

FIG. 7 is a diagram showing a data configuration example of log information generated by an image processing apparatus 110 in the present exemplary embodiment. The log information includes each item of a log identifier, a date and time of occurrence, a monitoring event identifier, a monitoring event, monitoring event details, a user ID, and a result. The log identifier is information for identifying log information. The date and time of occurrence is the date and time when the event occurred. The monitoring event identifier is information for identifying the monitoring event that has occurred. The monitoring event is text information that simply represents the monitoring event, and is selected from a preset list of monitoring events. The monitoring event details are text information indicating the details of the monitoring event. For example, in a case where the event has the system parameter changed, the changed parameter name and value are set. The user ID is the user ID of the user who caused the event. In the result, the result such as success/failure of the event that has occurred, and in a case of failure, the reason and the like are set.

In a case where the log information of the data configuration described above is generated, the log information transmission control unit 114 confirms whether or not the VPN is connected at the present time. In a case where the VPN is connected (Y in step S183), the log information can be transmitted to the control apparatus 220. Therefore, the log information transmission control unit 114 transmits the generated log information to the control apparatus 220 via the VPN (step S188). The log information transmitted here is, for example, the log information 71 in FIG. 7.

Figure 5:
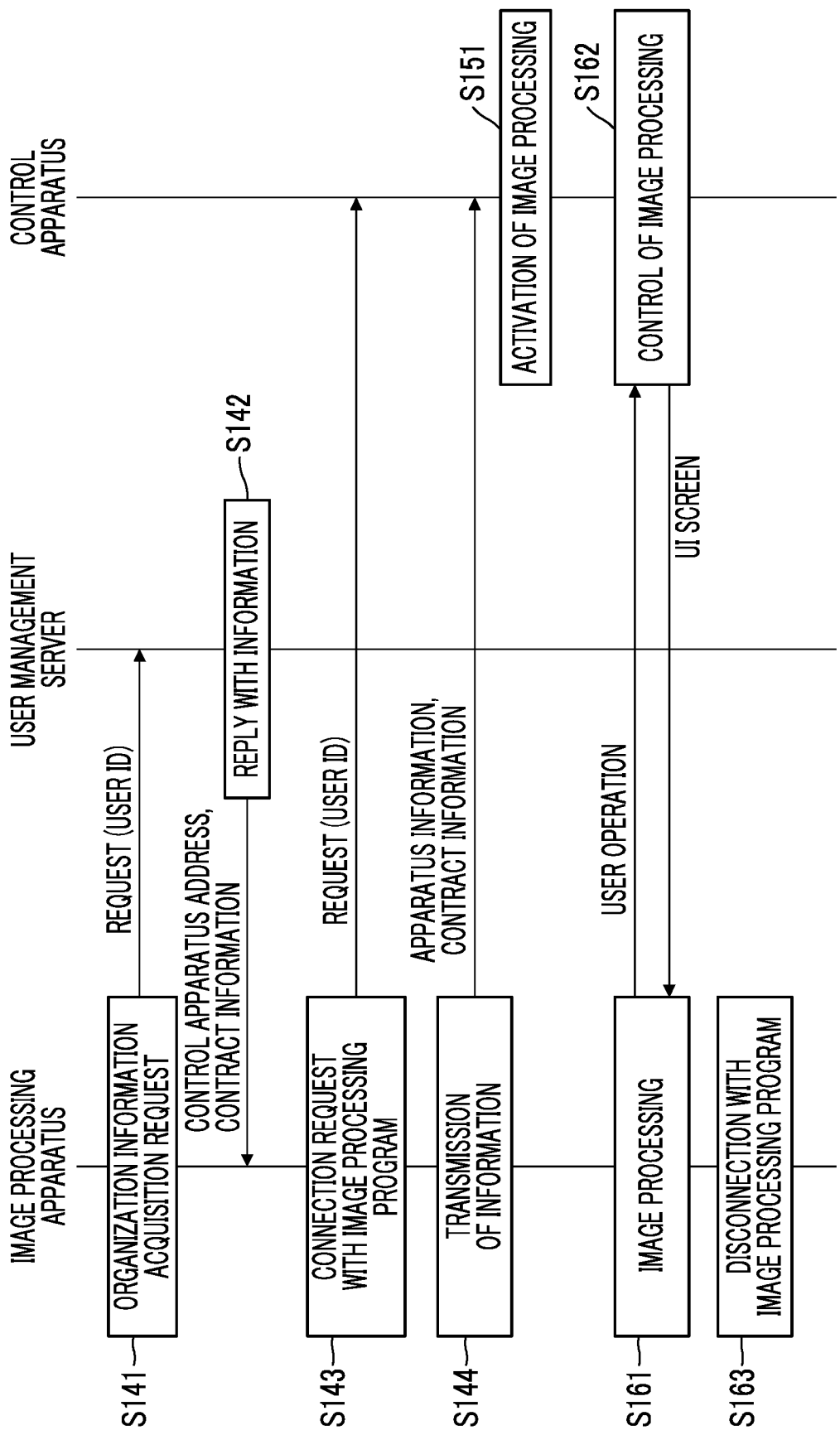
FIG. 5 is a sequence diagram showing processing performed at the time of the image processing control in the present exemplary embodiment.

The fact that the VPN is connected means that, when the image processing and the execution control of the image processing described with reference to FIG. 5 are being performed, the log information transmission control unit 114 executes the transmission of log information in parallel with the time when the image processing unit 111 is executing the image processing before the VPN is disconnected.

Figure 4:
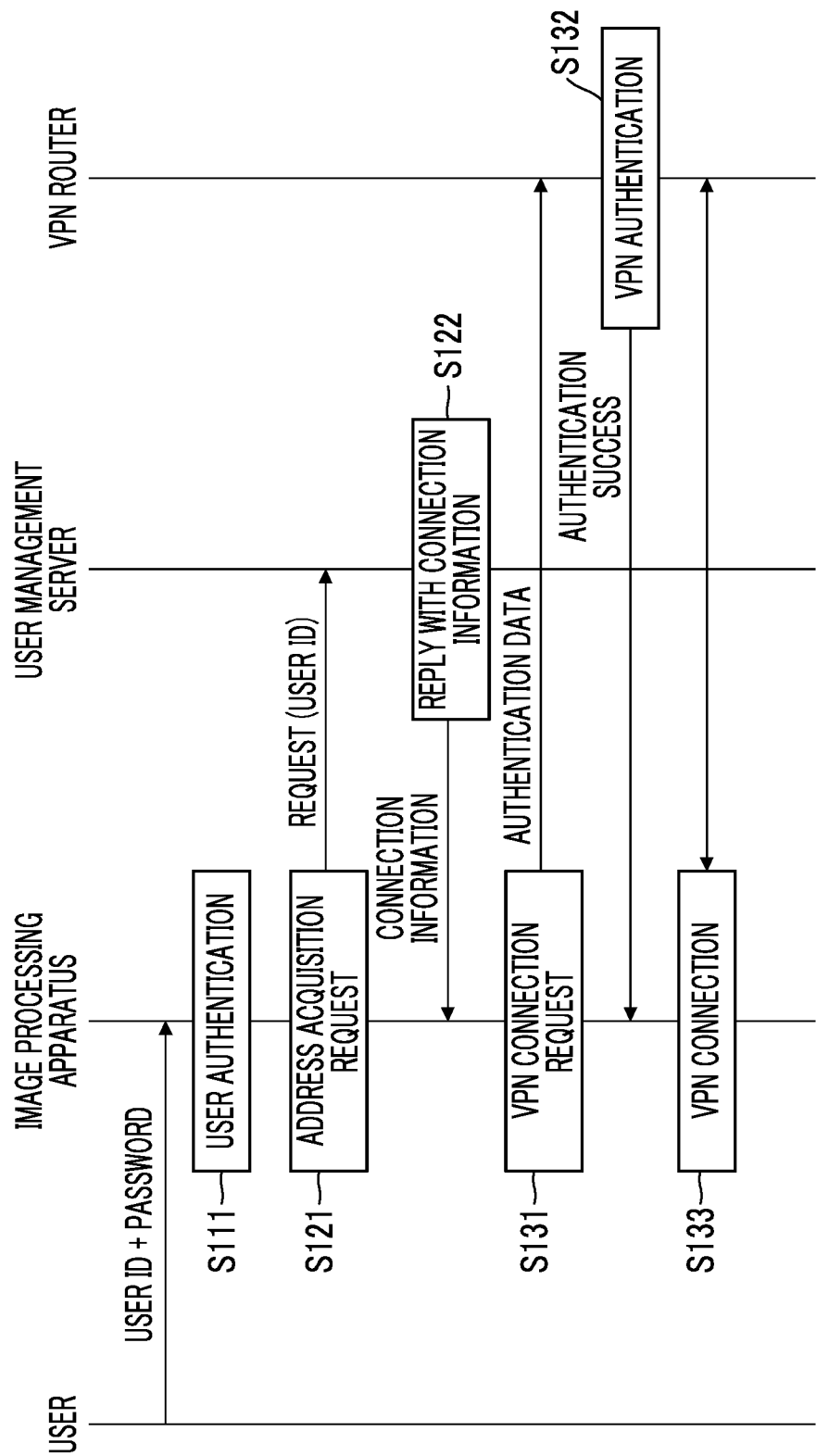
FIG. 4 is a sequence diagram showing processing performed at the time of VPN connection in the present exemplary embodiment.

On the other hand, in a case where the VPN is not connected (N in step S183), the event that occurred is login (Y in step S184), and the login has succeeded (Y in step S185), as described with reference to FIG. 4, the VPN connection unit 112 performs VPN connection with the VPN router 210 (step S186). Accordingly, the image processing apparatus 110 can communicate with the control apparatus 220 via the VPN, and the log information transmission control unit 114 transmits the generated log information to the control apparatus 220 via the VPN (step S188). The log information transmitted here is, for example, log information 71 in FIG. 7.

The log information transmission control unit 114 confirms whether or not the log information is stored in the log information temporary storage unit 115 before transmitting the log information, but at this point, assuming that no log information is stored, the log information transmission control unit 114 will transmit only the log information 71. In a case where the transmission of the log information 71 is normally finished, the log information transmission control unit 114 deletes the log information that could be normally transmitted from the log information temporary storage unit 115. Alternatively, without deleting the log information, the log information may be managed so that the finished/unfinished state of transmission can be determined by associating flag information indicating that the message has been transmitted or has not been transmitted with the log information, and setting the transmitted flag information in the transmitted log information.

In this manner, in a case where the VPN is not connected, the image processing apparatus 110 in the present exemplary embodiment transmits the log information regarding the event to the control apparatus 220 after the VPN connection is performed.

Here, in a case where the user fails to log in (N in step S185), the VPN remains disconnected. In this case, the log information transmission control unit 114 cannot transmit the generated log information to the control apparatus 220 via the VPN. Therefore, in this case, the log information transmission control unit 114 stores the generated log information in the log information temporary storage unit 115 (step S187). The log information stored here is, for example, log information 73 in FIG. 7.

Further, in a case where the VPN is not connected (N in step S183) and the event that occurred is not login (N in step S184), the VPN is not connected in this case as well, so that the log information transmission control unit 114 stores the generated log information in the log information temporary storage unit 115 (step S187). The log information stored here is, for example, log information 72 in FIG. 7.

Here, it is assumed that the VPN connected by the user logging in is disconnected at the time when the user logs out. More specifically, in a case where the user performs an operation for logging out, the user is logged out of the image processing apparatus 110 after the VPN is disconnected. Therefore, since the event of logout is executed when the VPN is not connected, the log information 72 shown in FIG. 7 is stored in the log information temporary storage unit 115 without being transmitted via the VPN at the time when the event occurs.

Here, for example, it is assumed that the log information 73 is stored in the log information temporary storage unit 115 because a user User02 fails to log in. At this point, the log information temporary storage unit 115 stores the log information 72 and 73 that have not yet been transmitted. In this state, in a case where a user User01 succeeds in logging in (Y in step S185), the VPN is connected as described above (step S186). Accordingly, the log information transmission control unit 114 transmits the generated log information to the control apparatus 220 via the VPN, but before transmitting, the recording status of the log information in the log information temporary storage unit 115 is confirmed. Here, since the log information 72 and 73 are stored in the log information temporary storage unit 115, the log information transmission control unit 114 reads out the log information 72 and 73 from the log information temporary storage unit 115, and transmits the log information 72 and 73 together with the generated log information 74 to the control apparatus 220 via the VPN (step S188).

In this way, according to the present exemplary embodiment, the log information that could not be transmitted because the VPN was not connected may be transmitted at the timing when the VPN is connected thereafter.

In the present exemplary embodiment, although the description is made based on the premise that the VPN connection is successful in step S186, there may be a case where the VPN connection fails. In a case where the VPN connection fails, the log information cannot be transmitted via the VPN, so that the log information transmission control unit 114 stores the generated log information in the log information temporary storage unit 115.

Further, assuming that a plurality of coworking LAN systems 100 are present, the log information transmission control unit 114 may add, for example, apparatus identification information of the image processing apparatus 110 to the log information to be transmitted. Accordingly, the control apparatus 220 may specify the image processing apparatus 110 that is the transmission source of the log information, in other words, the image processing apparatus 110 in which the event has occurred.

Further, the log information transmission control unit 114 may acquire an auditor ID read out from the user management information, specifically, an auditor ID corresponding to the organization ID of the company of the company LAN system 200 connected to the VPN by instructing the information acquisition unit 113, add the auditor ID to the log information to be transmitted, and then transmit the log information. Accordingly, the transmitter of the log information is regarded as an auditor, and the company to which the log information is transmitted is convenient in a case where the auditor wants to handle the log information. In a case where the auditor ID is not added to the log information, the transmitter will be the user identified by the user ID included in the log information.

Hereinafter, the processing executed by the control apparatus 220 regarding the collection of log information will be described.

In a case where an event to be recorded in the log occurs in the control apparatus 220, the log management unit 224 generates log information regarding the event and stores the generated log information in the log information storage unit 225. As described above, in a case where the log information is transmitted from the image processing apparatus 110, the log information acquisition unit 223 acquires the log information. Then, the log management unit 224 stores the log information acquired by the log information acquisition unit 223 in the log information storage unit 225.

The data configuration of the log information stored in the log information storage unit 225 may be basically identical to the data configuration of the log information shown in FIG. 7. However, in order to be able to specify which image processing apparatus 110 the event occurred in, the identification information of the image processing apparatus 110 added to the log information may be stored together. That is, information that can determine whether the event has occurred in one of the image processing apparatuses 110 or the control apparatus 220 is added to the log information to be stored. In a case where an auditor ID is added to the log information received by the log information acquisition unit 223, the auditor ID is also stored.

Incidentally, the log management unit 224 basically registers the log information in the log information storage unit 225 in the order of acquisition. As described above, in a case where the VPN is not connected, a plurality of pieces of log information may be collectively transmitted from the image processing apparatus 110 at the time when the VPN is connected. In this case, the log information storage unit 225 may not store the log information in the order in which the events occur.

Therefore, the log management unit 224 rearranges the log information in chronological order and stores the log information in the log information storage unit 225 again. Accordingly, the order in which the events occur may be easily recognized, and the audit using the log information becomes easy.

According to the present exemplary embodiment, the log information distributed and recorded in the image processing apparatus 110 and the control apparatus 220 may be collected in the control apparatus 220 as described above.

In the present exemplary embodiment, although the case where the image processing apparatus 110 is installed in a coworking space which is a shared space has been described as an example, in a case where the connection can be made via VPN, the installation location of the image processing apparatus 110 need not be limited to the shared space.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
a first processor that is mounted on an image processing apparatus configured to perform processing of forming an image on a medium or processing of scanning an image on a medium; and
a second processor that is mounted on a control apparatus that is connected to the image processing apparatus via a virtual leased line, and controls a part of at least one of the processing of forming an image on a medium or the processing of scanning an image on a medium performed by the image processing apparatus, wherein
the first processor is configured to:
in a case where an event to be recorded in a log occurs in the image processing apparatus and the virtual leased line is successfully connected in response to an occurrence of a first login event, directly transmit log information regarding the event and the first login event to the control apparatus via the virtual leased line,
in a case where the virtual leased line is not connected during the occurrence of the event, store the log information regarding the event in a temporary storage unit of the image processing apparatus, wherein the log information includes a log regarding a failure of the first login event if the first login event failed to successfully connect to the virtual leased line, and
in a case where the connection of the virtual leased line is successfully performed again in response to occurrence of a second login event after the occurrence of the first login event, transmit the log information stored in the temporary storage unit of the image processing apparatus together with an other log information newly generated regarding the second login event to the control apparatus via the virtual leased line; and
the second processor is configured to:
in a case where the event occurs in the control apparatus, store log information regarding the event in a storage unit of the control apparatus; and
store the log information and/or the other log information transmitted from the image processing apparatus via the virtual leased line in the storage unit of the control apparatus.

2. The image processing system according to claim 1, wherein the virtual leased line is disconnected at a time of being logged out of the image processing apparatus.

3. The image processing system according to claim 1, wherein the first processor is configured to:
add identification information of the image processing apparatus to the log information to be transmitted to the control apparatus.

4. The image processing system according to claim 1, wherein the second processor is configured to:

arrange the log information in chronological order and store the log information in the storage unit of the control apparatus.

5. A non-transitory computer readable medium storing a program causing a computer to achieve a function, the computer including at least one of an image forming unit that performs processing of forming an image on a medium or an image scanning unit that performs processing of scanning an image on a medium, and causing a control apparatus to control a part of at least one of the processing of forming an image on a medium or the processing of scanning an image on a medium via a virtual leased line, the function comprising:

directly transmitting, in a case where an event to be recorded in a log occurs in the computer and the virtual leased line is successfully connected in response to an occurrence of a first login event, log information regarding the event and the first login event to the control apparatus via the virtual leased line;

storing, in a case where the virtual leased line is not connected during the occurrence of the event, the log information regarding the event in a temporary storage unit of an image processing apparatus, wherein the log information includes a log regarding a failure of the first login event if the first login event failed to successfully connect to the virtual leased line; and transmitting, in a case where the connection of the virtual leased line is successfully performed again in response to occurrence of a second login event after the occurrence of the first login event, the log information stored in the temporary storage unit of the image processing apparatus together with an other log information newly generated regarding the second login event to the control apparatus via the virtual leased line.

6. An image processing system comprising:

a first processor that is mounted on an image processing apparatus including at least one of an image forming unit that performs processing of forming an image on a medium or an image scanning unit that performs processing of scanning an image on a medium; and a second processor that is mounted on a control apparatus that is connected to the image processing apparatus via a virtual leased line, and controls a part of at least one of the processing of forming an image on a medium or the processing of scanning an image on a medium performed by the image processing apparatus, wherein the first processor includes:

means for, in a case where an event to be recorded in a log occurs in the image processing apparatus and the virtual leased line is successfully connected in response to an occurrence of a first login event, directly transmitting log information regarding the event and the first login event to the control apparatus via the virtual leased line, means for storing the log information regarding the event in a temporary storage unit of the image processing apparatus in a case where the virtual leased line is not connected during the occurrence of the event, wherein the log information includes a log regarding a failure of the first login event if the first login event failed to successfully connect to the virtual leased line, and means for transmitting the log information stored in the temporary storage unit of the image processing apparatus together with an other log information newly generated regarding a second login event to the control apparatus via the virtual leased line in a case where the connection of the virtual leased line is successfully performed again in response to occurrence of the second login event after the occurrence of the first login event; and the second processor includes:

means for, in a case where the event occurs in the control apparatus, storing log information regarding the event in a storage unit of the control apparatus; and means for storing the log information and/or the other log information transmitted from the image processing apparatus via the virtual leased line in the storage unit of the control apparatus.

\* \* \* \* \*